May 26, 1936.  R. P. ROSS  2,042,361
DEMONSTRATING APPARATUS
Filed May 7, 1935  3 Sheets-Sheet 2
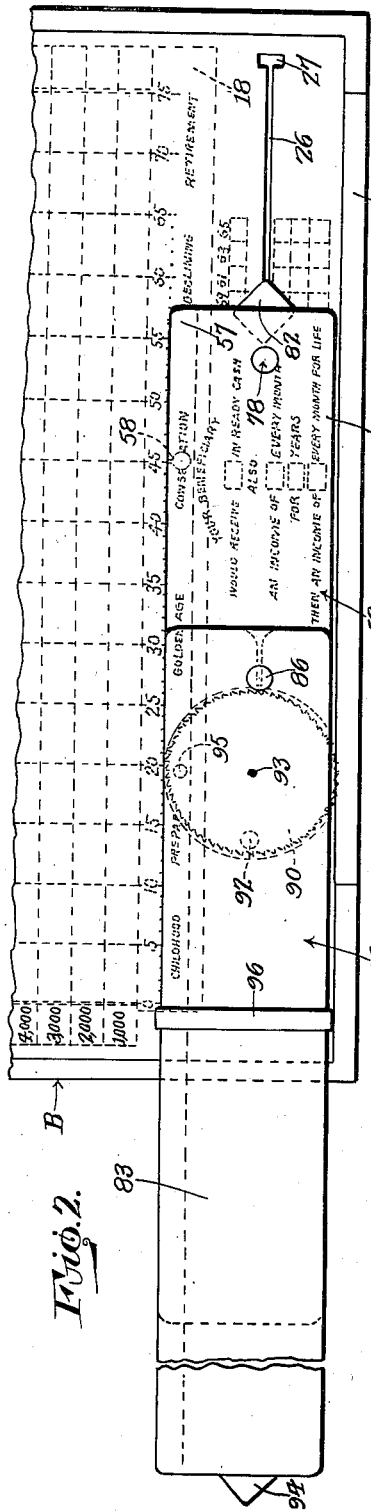
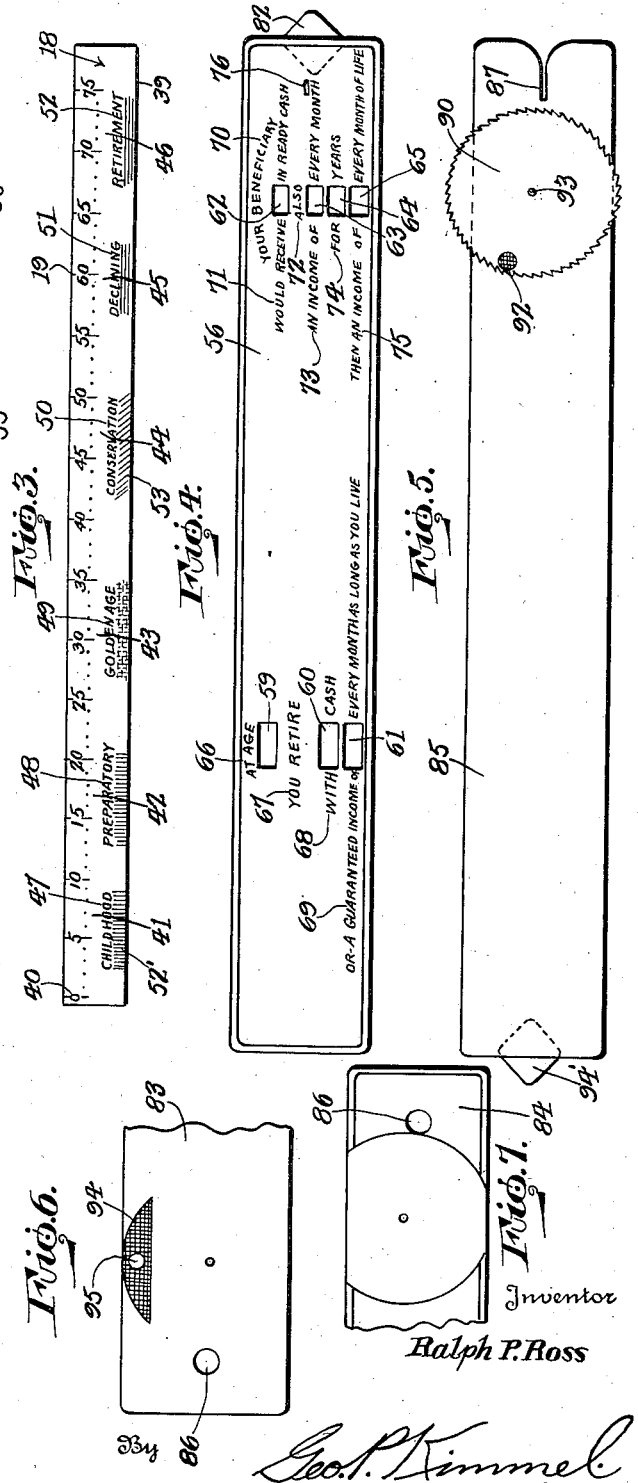
Inventor
*Ralph P. Ross*
By *Geo. P. Kimmel*
Attorney

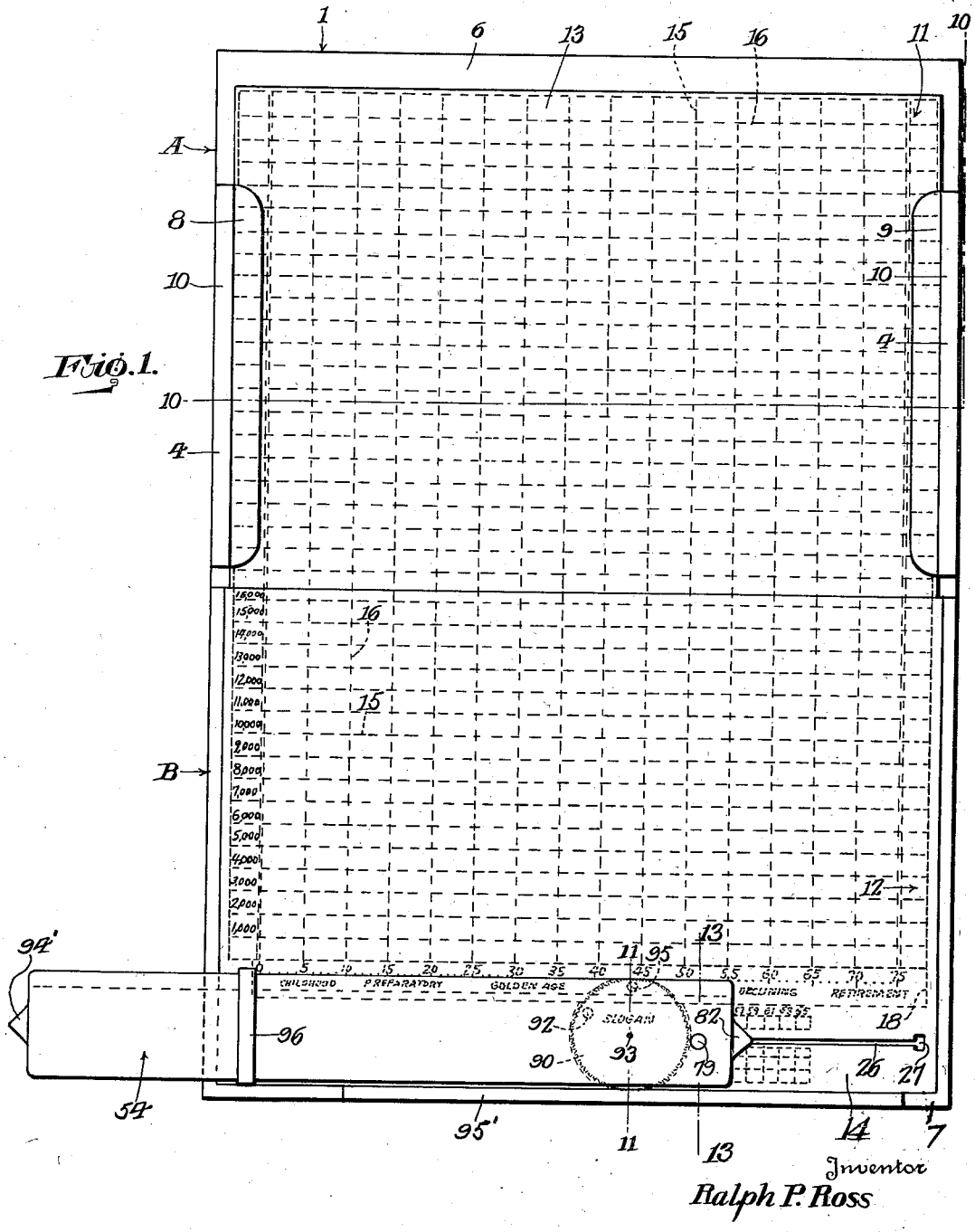

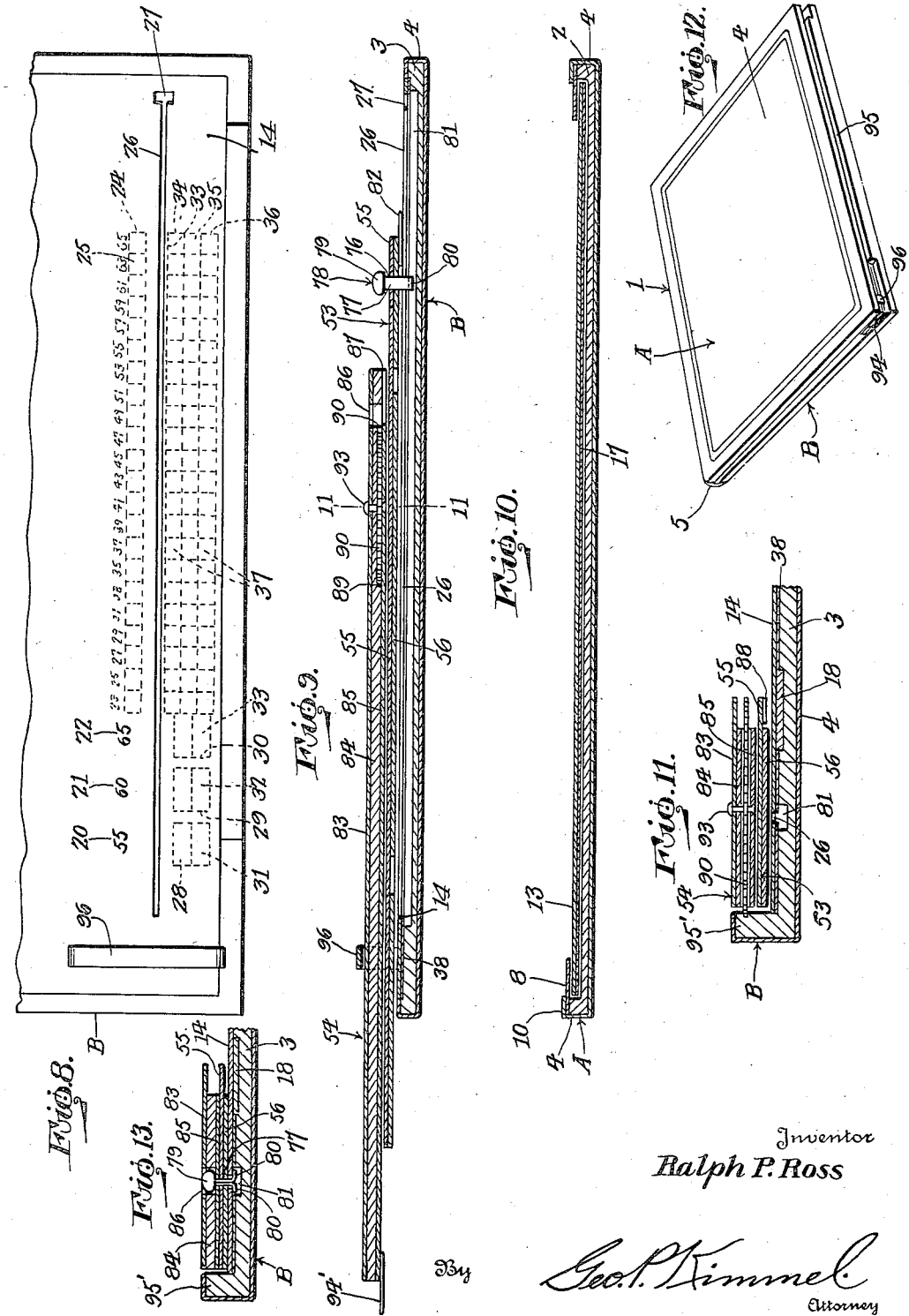

Patented May 26, 1936

2,042,361

UNITED STATES PATENT OFFICE 2,042,361

DEMONSTRATING APPARATUS

Ralph P. Ross, Abilene, Tex., assignor to Scientific Sales Methods, Inc., Dallas, Tex.

Application May 7, 1935, Serial No. 20,241

5 Claims. (Cl. 35—24)

This invention relates to a demonstrating apparatus designed primarily for the use of life insurance salesmen, but it is to be understood that the apparatus is to be used in any connection for which it may be found applicable, and the invention has for its object to provide in a manner as hereinafter set forth, an apparatus of the class referred to for graphically illustrating, to an interested party or prospect, the uses of life insurance, as well as life insurance annuities and similar investments, particularly their adaptability to individual and family needs.

Further objects of the invention are to provide, in a manner as hereinafter set forth, an apparatus of the class referred to, which is comparatively simple in its construction and arrangement, strong, durable, compact, thoroughly efficient in its use, conveniently operated, readily assembled and comparatively inexpensive to manufacture.

To the above ends essentially, and to others which may hereinafter appear, the invention consists of such parts, and such combination of parts which fall within the scope of the invention as claimed.

In the drawings:

Figure 1 is a plan view of the apparatus, when extended, looking toward both sections of the graphic receiving chart, and with the apparatus in position for demonstrating, Figure 2 is a fragmentary view in plan of the apparatus looking towards the stationary section of the graphic receiving chart, and showing the slide elements thereof in adjusted position with respect to said chart section.

Figure 3 is a plan view of and looking towards the outer face of the life scale indicating element, Figure 4 is a plan view of and looking towards the outer face of the rear section of the outer slide element, Figure 5 is a plan view of and looking towards the outer face of the rear section of the outer slide element, Figure 6 is a fragmentary view in plan of and looking towards the inner face of the outer section of the outer slide element, Figure 7 is a fragmentary view in plan of and looking towards the outer face of the intermediate section of the outer slide element, Figure 8 is a fragmentary view in plan of the stationary section of the graphic receiving chart, Figure 9 is a longitudinal sectional view of the apparatus showing slide elements adjusted relative to each other, Figure 10 is a section on line 10—10, Figure 1, Figure 11 is a section on line 11—11, Figure 1, Figure 12 is a perspective view of the apparatus when closed, and Figure 13 is a section on line 13—13, Figure 1.

The apparatus includes a foldable cover element 1 of book-like form consisting of a pair of rectangular panels 2, 3 of any suitable material, and a bendable covering member 4 which is common to the panels. The member 4 is formed of a web of any suitable material and is secured to the panels throughout their outer faces, outer end edges and side edges. The latter is also extended upon and secured to the inner faces of said panels. The inner end edges of the panels are spaced from each other to provide for the part 5 of said member 4 to constitute a hinge. The panel 2 and that portion of the member 4 which is secured thereto constitutes the back section A of element 1. The panel 3 and that portion of the member 4 which is secured thereto constitutes the front section B of element 1. The panels 2, 3 are hinged together in a manner to provide, when element 1 is folded, for the inner faces 6, 7 of the sections A, B respectively to oppose each other.

Mounted on the sides of section A and extending inwardly therefrom is a pair of oppositely disposed transparent elongated retainers 8, 9 which oppose face 6 of section 8. The outer side portions of the said retainers are positioned under and retained in position by the parts 10 of member 4.

The apparatus includes a graphic receiving chart formed of an adjustable and a stationary section 11, 12 respectively. The section 11 is mounted against the face 6 of cover section A and is slidably connected to the latter by the retainers 8, 9. The section 11 forms a continuation of section 12. The latter is fixedly secured to the face 7 of cover section B by a suitable cementitious material. The sections 11, 12 include panels 13, 14 respectively of any suitable transparent clear surfaced material. The inner faces of the panels 13, 14 are provided with parallel spaced longitudinal lines 15 and parallel spaced horizontal lines 16 intersecting the longitudinal lines. The lines 15 and 16 are employed when preparing graphics on the outer surface of a chart section. The lines 15 of section 11 endwise align with the lines 15 of section 12. The lines 15 and 16 are disposed throughout the inner face of panel 13. The lines 15 and 16 do not extend throughout the panel 14 but terminate at a point spaced from the outer end of such panel. The inner face of panel 3 has applied throughout thereof a coating 17 (Figure 10) of cream colored enamel, leaving the outer surface of panel 3 of clear celluloid for writing, figuring and graphing thereon with marks which may be easily removed. The longitudinal lines 15 are to represent dollars. The horizontal lines 16 designate the ages of life. The panel 14 has secured to its inner face a life scale indicating element 18 (Figures 1, 2 and 8). The top of the element 18 registers with the outer longitudinal line 15 on panel 14. The graduations 19 of element 18 register with the horizontal lines on panel 14. The element 18, visible through panel 14, will be hereinafter more fully referred to. The latter has its inner face, below element 18, provided with the retirement age indicators (Figure 8) fifty-five, sixty and sixty-five, as at 20, 21 and 22 respectively. The indicators are disposed in parallel spaced relation. The inner face of panel 14 is provided with means, as at 24, to form a longitudinal row of progressively increasing odd numbered, separate, square, parallel spaces 25 for receiving the amount of cash and income insurance the beneficiary would receive at whatever age the death of the insured might occur. The row of spaces 25 extends from and is disposed in endwise spaced alignment with respect to indicator 22. The odd numbering of the spaces 25 starts at twenty-three and ends at sixty-five. The designating of the spaces 25 with odd numbers is because these numbers pertain to the squares for the recording of insurance proceeds, etc., every two years. The spaces 25 are so small that it would be impossible to show these figures every year, so the intention is to record them only once for each two year period. Further the odd numbering is had instead of even in order that the final showing will be at the age of sixty-five, which is the usual age for maturing a policy, the proceeds of which are to be used as an annuity or retirement income. The retirement age indicators and the means 24 are visible through panel 14. The latter below and in proximity to the retirement age indicators and means 24 is provided with a longitudinal slot 26 (Figures 1, 2 and 8) having one of its ends enlarged, as at 27. The slot 26 extends beyond the means 24 and the indicator 20. The panel 14, outwardly with respect to the slot 26 (Figure 8) has its inner face provided with conventional spaced means designated 28, 29, 30 to form spaced parallel pairs of rectangular spaces 31, 32, 33 respectively for receiving the indication of the amount of cash and income available for retirement of the insured at the ages of fifty-five, sixty and sixty-five. The means 28, 29, 30 are arranged in alignment with the indicators 20, 21 and 22 respectively. The said means 28, 29, 30 are visible through panel 14. The latter has its inner face, (Figure 8) below slot 26, provided with means, as at 33, to form a series of superimposed longitudinal rows 34, 35, 36 of separate, square spaces 37 which align with and are for the same purpose as the spaces 25. The number of spaces 37 of each row 34, 35, 36 correspond to that of the number of the spaces 25. One end of the said rows 34, 35, 36 registers with one end of the pair of spaces 33. The means 33 is visible through panel 14. The inner face of panel 14 has applied thereto throughout a coating 38 (Figure 9) of cream colored enamel, leaving the outer surface of panel 14 of clear celluloid for writing, figuring and graphing thereon which may be easily removed. The cementitious material which secures the chart section 12 to the front section B of the element 1 is applied to the coating 38 after the latter has been applied to the inner face of panel 14.

The life scale element 18 is formed from an oblong strip 39 of suitable material provided on its outer face with a scale 40 from 0 to seventy-five representing the years of a person's life. The scale is divided into six divisions 41, 42, 43, 44, 45 and 46 designated Childhood, Preparatory, Golden Age, Conservation, Declining and Retirement as at 47, 48, 49, 50, 51 and 52 respectively. Each period is identified by a special color 52. The color of an earlier period gradually blends into the color of the next later period. Preferably the colors used from left to right will be pink, old rose, gold, green, blue and lavender.

The apparatus includes an inner and an outer slide element 53, 54 respectively. These elements are arranged in superimposed relation with the element 53 normally concealing the retirement age indicators, the spaces 25, 31, 37 and the major portion of element 18. The element 53 is slidably connected to front section B of cover element 1. The element 54 is normally detachably connected to the element 53 whereby said elements 53, 54 may be bodily shifted together or the element 54 shifted independently of element 53. The elements 53, 54 are of the same length, but of a length slightly less than that of cover section B.

The element 53 is for selectively exposing respectively the retirement age indicators, the spaces 25, the pairs of spaces below the retirement age indicators and the spaces 37 of the rows of spaces 34, 35, 36. The element 53 includes an oblong outer section 55 of clear transparent material and an oblong inner section 56 of opaque material having its outer face secured throughout to the inner face of section 55. The sections 55, 56 are of the same length, but section 56 is of less width than that of section 55. The sections 55, 56 have their end edges and their outer lengthwise edges flush. The inner lengthwise edge of section 55 is extended beyond the inner lengthwise edge of section 56. That part of section 55 which extends from section 56 is indicated at 57 and is provided on its inner face, adjacent its inner end, with a small circular visible indicator 58 for a purpose to be referred to. The section 56 is formed with a transverse row of windows 59, 60, 61 between its transverse median and its outer end. The section 56 is also formed with a transverse row of windows 62, 63, 64, 65 arranged in proximity to its inner end. The windows are for exposing information or data carried by the chart section 12. The window 59 is arranged in parallel spaced relation to the window 60. The window 62 is arranged in parallel spaced relation to the window 63. The section 56 has its outer face provided with conventional means, as at 66, 67, 68 and 69, visible through section 55 for setting forth the purpose of the information or data exposed through the windows 59, 60 and 61. The section 56 has its outer face also provided with conventional means, as at 70, 71, 72, 73, 74 and 75, visible through section 55 for setting forth the purpose of the information or data exposed through the windows 62, 63, 64 and 65. The section 55 extends across all of the windows in section 56. The sections 55, 56 having aligning openings 75 (Figures 8 and 13) through which extends the shank 77 of a coupling member 78 employed for slidably connecting the slide 53 to the chart section 18. The member 78 is formed with a head 79 at the outer end of shank 77 and a pair of oppositely disposed arms 80 at the inner end of the shank 77. The arms 80 are disposed at right angles to shank 77. The latter extends through the slot 26 and in a groove 81 (Figures 9, 11 and 13) formed in the cover section B of element 1. The groove 81 is of greater width than that of slot 26. The arms 80 oppose the inner face of chart section 12 and coact with head 79 to slidably connect the element 53 to cover section B. The enlarged end 27 of slot 26 is provided for the entrance of the arms 80 into groove 81. The element 53 at its inner end has attached thereto a pull tab 82.

The slide element 54 (Figures 9 and 11) comprises a front section 83, an intermediate section 84 and a rear sectiton 85. The said sections are of oblong contour and of the same length. The sections 84, 85 are of the same width. The section 83 is of greater width than the sections 84, 85. The outer lengthwise edges and end edges of said sections are flush. The section 83 is formed of clear transparent material, preferably celluloid. The section 84 is formed of card board, and the section 85 of thin metal. The sections 83, 84, in proximity to their inner ends, are formed with a circular opening 86, the wall of which coacts with the head 79 of coupling member 80 (Figure 13) for detachably latching element 54 to element 53 whereby the said elements will bodily slide together. When element 54 is unlatched it is slidable independent of element 53. The section 85, at its inner end, is slitted as at 87. The slit opens at the inner end of section 85 and its purpose is for the insertion of section 85 between element 53 and section 84. The slit provides a clearance for shank 77. The section 83 projects beyond the inner lengthwise edges of the sections 84, 85 and said projecting part is designated 88. The inner face of section 84, adjacent its inner end, is formed with a circular recess 89 opening at each lengthwise edge of said section. Arranged in recess 89 is a thin circular metallic disc 90 of a diameter to project beyond the lengthwise edges of said section 84. The disc 90 is painted white, has its edge throughout provided with saw teeth 91, and in proximity to said edge, the disc 90 (Figure 5) is formed in its outer face with a black circular indicator 92 for a purpose to be referred to. The disc 90 is revoluble about a pivot 93 which anchors the sections of element 54 together. The part 88 of section 83 is formed on its inner face with an opaque coating 94 of segmental contour provided centrally with a window 95 for a purpose to be referred to. The inner end portion of section 83 is suitably secured to the section 84. That part of section 85 leading from pivot 93 to the inner end edge of such section is free of connection to section 84. The sections of element 54 adjacent the outer end of the latter are suitably connected together. The outer end of element 54 is provided with a pull tab 94'. The teeth of the disc 90 engage in the inner face of a rib 95' formed on the cover section B. A combined guide and retainer member 96 for the elements 53, 54 is carried by cover section B.

The indicator 58 is to be moved over the life scale element 18 when a demonstration is being carried out by the apparatus. The element 18 represents the person's life moving ahead from year to year and period to period. Through the windows 62, 63, 64 and 65 may be seen the exact condition of the insured's estate at any age when death might occur. These windows are to reveal the amount of ready cash the beneficiary would receive; amount of monthly income; number of years such income would continue and amount of monthly income during the balance of beneficiary's life time. Through the windows 59, 60 and 61 may be seen the condition of the insured's estate in case he lives to the retirement age. The windows 59, 60 and 61 reveal the age of retirement; amount of cash available and a guaranteed monthly life income in lieu of cash. The windows in the inner slide element 53 are normally closed by outer slide element 54.

When the slide elements 53, 54 are arranged in superimposed relation and non-shiftable relative to each other, the window 95 is arranged over the indicator 58. On each revolution of disc 90 the latter passes directly under window 95 and prevents vision of the indicator 58 until the slide element 54 is shifted outwardly upon slide element 53. When demonstration is being carried out, the indicator 92 cannot be seen by an observer in any position until it passes under window 95 and is exposed.

When the demonstration is made the elements 53, 54 are moved inwardly in unison whereby the disc 90 will be caused to revolve due to the engagement of the teeth thereof with rib 95. The indicator 92 represents the death of the insured. The disc 90 completely blots out the indicator 58 which represents the life of the insured. As with death, it is a matter of chance when indicator 92 comes around. It appears suddenly and without warning. When it does appear, during the demonstration the inward movement of the elements 52, 54 is discontinued. The element 54 is then detached from element 53 and moved outwardly whereby there is revealed through windows 62, 63, 64 and 65 the exact condition of his insurance estate at the time of his death. If indicator 92 does not appear before the age agreed upon for retirement, element 54 is moved independently of element 53 and to an extent whereby the windows 59, 60 and 61 will reveal the condition of the estate for retirement.

In making a demonstration by the apparatus to a life insurance prospect, the recommended program is all figured out in advance by the agent, based on preliminary information. The complete program is shown in graph form on the chart. The program may be charted in any form to suit the individual agent, showing the recommended life insurance protection at every age, how funds are provided for children's college education and the insured's own retirement period. It may show, also, cumulative premium deposits, cumulative cash values, etc., all in graph for quick and easy visualization by the prospect.

What I claim is:

1. In a demonstrating apparatus for the use of insurance salesmen, a chart having means carrying spaced groups of insurance data to be concealed, means carrying permanently exposed insurance data for association with the groups of data and means to constitute a life age scale interposed between the said means for carrying the groups of data to be concealed and the means for carrying the data to be permanently exposed, the said life age scale being associated with the data upon the chart, an inner slide positioned in superimposed relation with respect to said chart and disposed to conceal the spaced groups of data and a portion of said scale, said slide having spaced selectable sets of windows for exposing a selected group of data, said slide being provided with an indicator representing the life of the insured for indicating a selected age point of said life scale and a selected group of data, an outer slide positioned upon and latched to the inner slide to provide for the slides bodily moving together in either direction, said outer slide closing said sets of windows and capable, when released from the inner slide, of being moved independently of the inner slide in either direction for opening a set of windows to expose the data of a selected group, said outer slide being formed with a window, a toothed disc inwardly of said window of and carried by and within the outer slide for permanently concealing said indicator and revoluble on the bodily moving of the slides in unison and when the outer slide is moved independently of the inner slide, said disc being provided with a concealed death indicator bodily moving therewith for exposure through the window on the outer slide to indicate the death of the insured and for designating when the outer slide is to be moved relatively to the inner slide to expose the selected group of data, and supporting means for the chart provided with means coacting with the teeth of the disc for revolving the latter on the shifting of the slides in unison and on the shifting of the outer slide independently of the inner slide.

2. In a demonstrating apparatus for the use of insurance salesmen, a chart having means carrying spaced groups of insurance data to be concealed, means carrying permanently exposed insurance data for association with the groups of data and means to constitute a life age scale interposed between the said means for carrying the groups of data to be concealed and the means for carrying the data to be permanently exposed, the said life age scale being associated with the data upon the chart, an inner slide positioned in superimposed relation with respect to said chart and disposed to conceal the spaced groups of data and a portion of said scale, said slide having spaced selectable sets of windows for exposing a selected group of data, said slide being provided with an indicator representing the life of the insured for indicating a selected age point of said life scale and a selected group of data, an outer slide positioned upon and latched to the inner slide to provide for the slides bodily moving together in either direction, said outer slide closing said sets of windows and capable, when released from the inner slide, of being moved independently of the inner slide in either direction for opening a set of windows to expose the data of a selected group, said outer slide being formed with a window, a toothed disc inwardly of said window of and carried by and within the outer slide for permanently concealing said indicator and revoluble on the bodily moving of the slides in unison and when the outer slide is moved independently of the inner slide, said disc being provided with a concealed death indicator bodily moving therewith for exposure through the window on the outer slide to indicate the death of the insured and for designating when the outer slide is to be moved relatively to the inner slide to expose the selected group of data, supporting means for the chart provided with means coacting with the teeth of the disc for revolving the latter on the shifting of the slides in unison and on the shifting of the outer slide independently of the inner slide, a coupling member connected to the inner slide, said outer slide having means coacting with said coupling member for latching the slides together, and said chart and said supporting means having parts coacting with said member for slidably connecting the inner slide to said supporting means.

3. In a demonstrating apparatus for the use of insurance salesmen, a chart having means carrying spaced groups of insurance data to be concealed, means carrying permanently exposed insurance data for association with the groups of data and means to constitute a life age scale interposed between the said means for carrying the groups of data to be concealed and the means for carrying the data to be permanently exposed, the said life age scale being associated with the data upon the chart, an inner slide positioned in superimposed relation with respect to said chart and disposed to conceal the spaced groups of data and a portion of said scale, said slide having spaced selectable sets of windows for exposing a selected group of data, said slide being provided with an indicator representing the life of the insured for indicating a selected age point of said life scale and a selected group of data, an outer slide positioned upon and latched to the inner slide to provide for the slides bodily moving together in either direction, said outer slide closing said sets of windows and capable, when released from the inner slide, of being moved independently of the inner slide in either direction for opening a set of windows to expose the data of a selected group, said outer slide being formed with a window, a toothed disc inwardly of said window of and carried by and within the outer slide for permanently concealing said indicator and revoluble on the bodily moving of the slides in unison and when the outer slide is moved independently of the inner slide, said disc being provided with a concealed death indicator bodily moving therewith for exposure through the window on the outer slide to indicate the death of the insured and for designating when the outer slide is to be moved relatively to the inner slide to expose the selected group of data, supporting means for the chart provided with means coacting with the teeth of the disc for revolving the latter on the shifting of the slides in unison and on the shifting of the outer slide independently of the inner slide, and a combined guide and retainer forming means common to said slides and connected to said supporting means.

4. In a demonstrating apparatus for the use of insurance salesmen of that type including a chart provided with spaced groups of concealed insurance data, the combination of an inner slide having means for slidably connecting it to the chart, an outer slide having means coacting with the slidably connecting means of the inner slide for latching said slides in superimposed registry relation, said inner slide being formed with selectable sets of windows for exposing a group of data selected from said spaced groups, said outer slide, when in registry relation with respect to the inner slide, closing said sets of windows, said outer slide being formed with a window and a concealed shiftable indicator for exposure through said window, said slides being shiftable in unison in both directions when in registry across the chart and said outer slide being shiftable from registry with the inner slide for opening a set of windows to expose a selected group of data, said indicator, when exposed through said window, designating the point when the outer slide is to be moved relative to the inner slide, and means for shifting said indicator to a position for exposure through said window when the slides are moved together when in registry and for shifting the indicator from exposed position when the outer slide is moved relatively to the inner slide.

5. In a demonstrating apparatus for the use of insurance salesmen a structure for exposing selectable insurance information carried by a chart, said structure consisting of an inner slide provided with selected sets of windows for exposing selected information on the chart, an oblong opaque member mounted of the selectable information on said inner slide for closing said windows, a transparent oblong member of greater width than and mounted upon said opaque member, said transparent member having an opaque portion formed with a circular inner edge to provide the transparent member with a window, a rotatable element interposed between and connected to said members and formed with a concealed indicator for exposure through said window of the transparent member on the revolving of said element, means for latching said members together and in registry with said inner slide for closing the windows of the inner slide, said members forming an outer slide for moving in unison with said inner slide with respect to said chart when said members and inner slide are in registry and for moving independently relative to the inner slide, and said indicator, when exposed through said window, indicating the point for the moving of the outer slide independently relative to the inner slide for uncovering a set of windows to provide for the exposure of the said selected information, and a support for the chart having means for rotating said element to expose said indicator when the slides move in unison and for revolving said element to conceal the indicator when the outer slide moves independently of the inner slide.

RALPH P. ROSS.